Sept. 16, 1958 A. R. A. BEEBER ET AL 2,852,377
BLUE PRINT PAPER
Filed Nov. 6, 1953
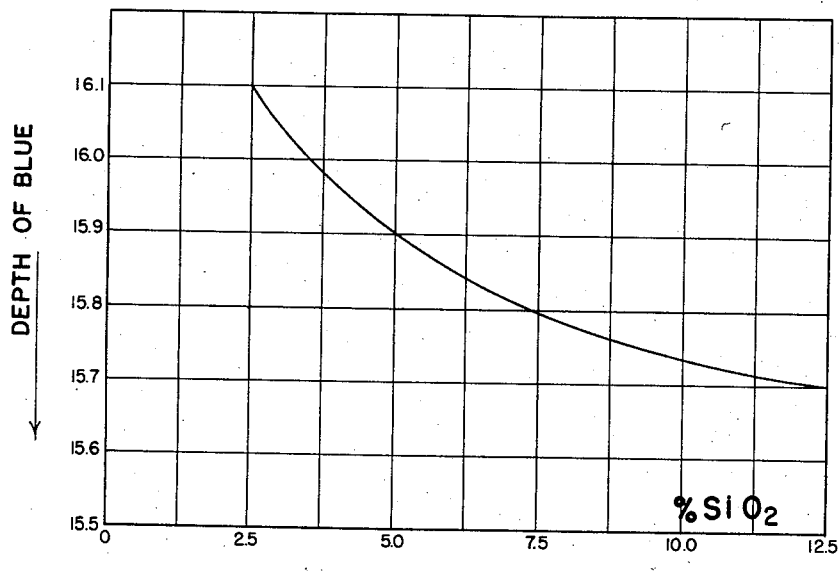
Fig. I
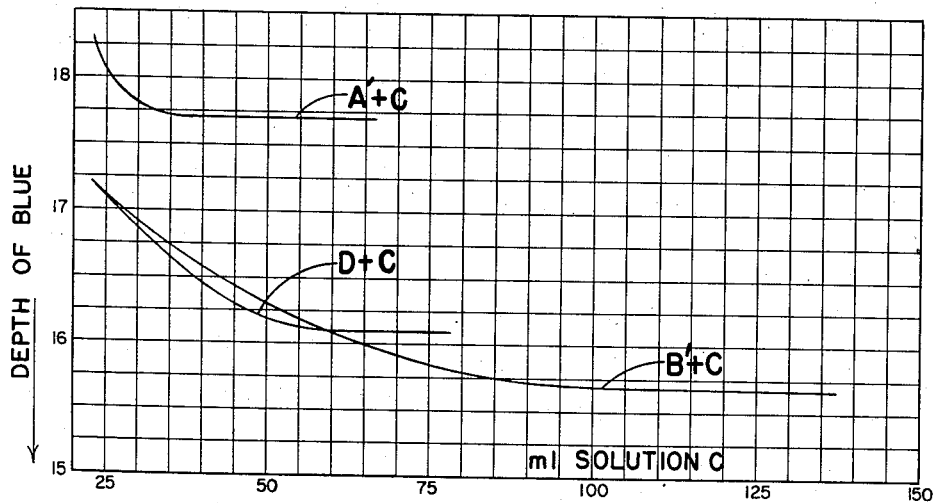
Fig. II.
INVENTORS
ALLAN R. A. BEEBER
ROBERT M. GOLD
BY
ATTORNEY

United States Patent Office 2,852,377
Patented Sept. 16, 1958

2,852,377

BLUE PRINT PAPER

Allan R. A. Beeber, Elizabeth, N. J., and Robert M. Gold, Brooklyn, N. Y., assignors to Keuffel & Esser Company, Hoboken, N. J., a corporation of New Jersey Application November 6, 1953, Serial No. 390,569

10 Claims. (Cl. 96—75)

This invention relates to blueprint papers and to improved methods for producing them.

Patent No. 2,433,515, of December 30, 1947, to Edward Jahoda describes the use of a precoating of silica on paper intended for the production of blueprint paper and other photosensitive papers. This patent represented a distinct advance in the art. However, the patent clearly teaches that the silica should be applied as a precoat before the light sensitive solution is applied implying that the same beneficial results would not be obtained if the silica were incorporated in the sensitizing solution. Furthermore, it is known, that others have attempted to include silica in blueprint solutions without achieving the outstanding improvement obtained by the Jahoda precoat method probably because the silica was not used in sufficiently high concentration.

Now it has been found that results at least equal to those obtained by the precoat method can be obtained by incorporating silica in the blueprint sensitizing solution if the amount of silica deposited on the paper is high enough. With higher amounts of silica the new method can give results which are definitely superior to any results obtained by precoating. However, lower amounts of silica, while not giving as good results as may be obtained by precoating will give some improvement over non-precoated papers and may be of some value in getting improved results without the necessity of the precoating step.

Increasing the concentration of silica increases the velvety appearance of the print and the purity of the blue color, improves contrast and reduces bleeding when additional ferrocyanide is added as described below. The presence of the silica in the sensitizing solution also inhibits crystallization of the blueprint salts as they are applied so that increased concentrations of these salts may be used. If sufficient silica is added, paper coated by this new method gives prints which are true blue (ultramarine) whereas the prints obtained from the usual precoated materials have a rather purplish blue color.

In addition to the advantage of simplifying the method and apparatus required for applying two coats instead of one, the new method has certain unexpected advantages.

The compositions of blueprint sensitizing solutions vary widely. However they all contain an iron cyanide salt such as potassium ferricyanide and potassium ferrocyanide and another iron salt which is usually a ferric salt but may also be a ferrous salt if appreciable quantities of ferricyanide are present. The various types are tabulated and discussed in Jahoda Patent No. 2,517,111 of August 1, 1950. The earliest blueprint coatings were made essentially from ferricyanide salts and ferric salts. Holden British Patent No. 418,369, of October 24, 1934, disclosed the use of ferrocyanide salts in combination with ferric salts. This British patent pointed out that the proportions of ferro and ferri-cyanide affected the speed of printing and the color of the prints.

Patent No. 2,093,738, of September 21, 1937, to Alger P. Reynolds discloses advantages for adding certain salts such as trisodium orthophosphate, tripotassium citrate and sodium metasilicate to blueprint sensitizing compositions containing ferrocyanides. As pointed out in Crowley Patent No. 2,323,798 of July 6, 1943, the addition of ferrocyanides as suggested by Holden and Reynolds supra, increased the speed of the paper but if the proportion of ferrocyanide was increased too much the quality of color was greatly impaired because of the greater proportion of solubilizing salts required. Contrary, to the action of the solubilizing salts disclosed in Reynolds, it has been found that the addition of silica to the blueprint solution improves the blue color and that when silica is present in the coating solution, higher proportions of ferrocyanide result in even greater improvement in the blue color. For this reason, it has been found that the silica containing solutions are particularly effective when at least one half of the total iron cyanide salts present are ferrocyanide on a molal basis. Preferably more than one half of the total cyanide salts should be ferrocyanide. Excellent results have been obtained with as high as 10 mols of ferrocyanide per mol of ferricyanide.

The presence of these higher proportions of ferrocyanide tends to lower the keeping quality of the papers coated with solutions containing silica but it has been found that this can be prevented if the pH of the solution is raised to alkaline range with potassium carbonate, preferably to 7.5–8.0 before it is applied to the paper and that under these conditions, the silica containing papers have better keeping quality than standard papers.

In the practice of precoating papers for blueprint it has been found that the best results are only obtained with particular types of silica dispersions. Apparently this is more than a question of particle size because dispersions of one manufacturer give good results whereas dispersions having the same particle size but from a different manufacturer resulted in practically no beneficial effect. Practically the only product which can be relied on to give good results as a precoat is Mertone of Monsanto Chemical Co. However, when the silica is added to the sensitizing solution, any and all types of silica which have been tried have been found to give good results as far as color intensity is concerned regardless of the manufacturer and regardless of the particle size providing they are suitable for dispersing in a coating solution. For example, Syloid 308, Santocel CX, Santocel C, Aerosil and Linde silica have all been found to give good results as well as Mertone. However, the particular shade of blue obtained may vary somewhat depending on the particle size and type of the silica dispersion. This permits control of the color tone desired in the practice of the invention. The particle size of the various types of silica referred to in the previous paragraph are as follows:

|  | Microns, diameter |
|---|---|
| Syloid 308 | 6–14 |
| Santocel CX | .5– 2 |
| Santocel C— | |
| 99% | <10 |
| 95% | < 5 |
| 85% | < 3 |
| 57% | < 1 |
| 39% | < 1 |
| Aerosil | .015–.020 |
| Linde (average) | .030 |

Meritone—

| | |
|---|---|
| 18% | 0.000– .080 |
| 64% | .080– .400 |
| 15% | .400–1.000 |
| 3% | >1.000 |

The Santocels are known to be made by the dehydration of silicic acid in an auto-clave. The silicic acid having been obtained by neutralizing sodium silicate with an acid.

Aerosil is known to be made by the burning of silicon tetrachloride. The other types of silica are believed to be made by modifications of either of these two basic processes.

Although the patent literature has disclosed the use of wetting agents in the sensitizing solutions for blueprint papers, it is believed that they have not been used to any great extent in the commercial art because they tend to carry the blueprint salts completely through the fibers of the paper despite the fact that blueprint solutions are normally applied to sized papers, whereas it is preferred to concentrate these salts at the coated surface. The defect which is likely to result in blueprint paper when wetting agents are added to the coating solution is commonly known in the art as "striking through." However, this does not happen readily when silica is present in the coating solution; i. e. the blueprint salts remain at the surface with the silica even when sufficient quantities of wetting agents are used to greatly improve the coating operation. In fact the coating operation has been improved to such an extent that the machine speed can be stepped up considerably higher than with normal coating and satisfactory coating can be achieved from a single roller whereas with normal coating at least two rollers are required with an intermediate soak path between them. Both nonionic and anionic wetting agents have been tried and work satisfactorily but it is believed that even cationic wetting agents could be used as long as they are compatible with the particular coating solution used.

Like precoated papers, the blueprint papers prepared according to the present invention (as disclosed so far) exhibit the property known as "feathering"; i. e. when written upon with ink, watercolors, erasing fluids and the like, the liquid "feathers" out making the writing illegible. It has been found that this can be prevented by adding a synthetic organic latex to the solution. From 1% to 10% of a dispersion containing 40–50% solids will do the job. A wide variety of latices compatible with the solution may be used. These include acrylics, vinyls, etc. such as Rhoplex, Polyco and Geon dispersions. In addition to preventing feathering, the latices increase the uniformity and smoothness of the print particularly in the low exposure range. Some improvement in this regard can even be achieved by using latices alone but the full advantages of the invention are obtained when the latex is used in combination with silica. When a surface active agent is used in a solution containing a latex, the solution tends to foam badly, but this can be prevented by adding an antifoam agent.

In conventional precoating blueprint practice, silica is applied to the paper stock at the rate of 1 lb. of $SiO_2$ per 1500–2000 sq. yds. of paper stock. A typical blueprint sensitizing solution containing about .45 gram mols of iron cyanide salts per gallon is applied to the precoated paper at the rate of 1 gal. per 200–250 sq. yds. It has been found that in order to obtain the same beneficial effect by applying silica in the coating solution, the amount of silica applied to the paper should be at least 2.0 lbs. per 1500–2000 sq. yds.; i. e. a minimum of 1 lb. per 1000 sq. yds. The mols of iron cyanide salts and the mols of other iron salts deposited per square yard of paper may be about the same as on precoated paper or for that matter as on papers which do not contain any silica at all or as previously pointed out the concentration may be increased since the silica inhibits crystallization of these salts. Good results are obtained by coating a solution containing the conventional concentrations of blueprint salts and about ¼ lb. of dispersed silica per gallon at the rate of 1 gal. per 200–250 sq. yds.; i. e. the same rate as the sensitizing solution applied to precoated paper. This solution may contain from 0.4 to .4 lb. per gallon of dispersed synthetic resin solids added in the form of a latex.

Some of the beneficial results obtainable by the present invention are illustrated in the following examples.

EXAMPLE I

A stock blueprint solution was made up as follows.

*Stock solution A*

| | Gram mols |
|---|---|
| Ferric salts | .135 |
| Alkali ferricyanide | .021 |

The above salts and the usual quantities of keeping salts were dissolved in water to make 350 ml.

*Stock solution B*

Exactly the same salts and quantities as for solution A were dissolved in a 15% aqueous colloidal silica solution sold under the trade name "Mertone" to make 350 ml.

*Stock solution C*

Alkali ferrocyanide .053 gram mols dissolved in water to make 100 ml.

The three stock solutions described above were combined in the proportions tabulated below to make up five coating solutions having the percentages of silica indicated.

| Coating Solution | A, milliliter | B, milliliter | C, milliliter | Percent $SiO_2$ |
|---|---|---|---|---|
| 1 | | 250 | 50 | 12.5 |
| 2 | 50 | 200 | 50 | 10.0 |
| 3 | 100 | 150 | 50 | 7.5 |
| 4 | 150 | 100 | 50 | 5.0 |
| 5 | 200 | 50 | 50 | 2.5 |

Samples of sized paper were coated with each of the five coating solutions approximately at the rate of one gal. per 200–250 sq. yds. and exposed under the same conditions in an exposure device to form wedge prints. The reflectivity of the ultimate blue (highest exposure) was measured on a reflectometer and the results followed a curve as shown in Fig. I of the drawing. The ordinates represent distances of a controlled light source from the paper which produce a reflection from the paper giving the same response on a photocell. Thus the closer the light must be brought to the sample to give the same reflection, the deeper is the blue color of the print.

The decreasing reflectometer readings indicate that higher percentages of silica produce prints with a deeper blue. The improvements due to the increased percentages of silica are even more readily apparent by visual examination of the prints.

EXAMPLE II

A series of solutions to show the effect of adding alkali ferrocyanide to conventional blueprint solutions were made up as follows:

| Coating Solution | $A^1$, ml. | C, ml. |
|---|---|---|
| 1 | 250 | 23 |
| 2 | 250 | 33 |
| 3 | 250 | 43 |
| 4 | 250 | 53 |
| 5 | 250 | 63 |

Stock solution $A^1$ contained the same proportions of ferric salts and alkali ferricyanide as solution A but minor variations were made in the keeping salts.

As a comparison, a second series of solutions was made up to show the effect of adding alkali ferrocyanide to blueprint solutions containing silica, as follows:

| Coating Solution | Stock Solutions | |
|---|---|---|
| | B¹, ml. | C, ml. |
| 1 | 250 | 23 |
| 2 | 250 | 33 |
| 3 | 250 | 43 |
| 4 | 250 | 53 |
| 5 | 250 | 63 |
| 6 | 250 | 83 |
| 7 | 250 | 103 |
| 8 | 250 | 133 |

Stock solution B¹ contained exactly the same salts and quantities of salts as solution A¹ but was made by dissolving these salts in Mertone as in the case of stock solution B.

Another stock solution, D, was made up containing the same salts as A¹ and B¹ but ½ the amount of $SiO_2$ present in stock solution B¹. A third series of coating solutions was then made up as follows:

| Coating Solution | D, ml. | C, ml. |
|---|---|---|
| 1 | 250 | 23 |
| 2 | 250 | 33 |
| 3 | 250 | 43 |
| 4 | 250 | 53 |
| 5 | 250 | 63 |

Samples of sized paper were coated with each of the three series of solutions and prints were made and tested as in Example I. The results are shown in Fig. II of the drawing.

The results show that deeper blues are obtained with the solutions containing silica. In addition, it is seen from the results of the first series that in the solution which does not contain silica, the improvement resulting from the addition of ferrocyanide soon reaches a saturation point so that increasing the proportions of ferrocyanide to ferricyanide above 1 to 1 on a molal basis does not result in any further improvement in blue color whereas when 15% silica is present the blue color continues to improve up to a ratio of 4 mols of ferrocyanide to one mol of ferricyanide for this particular solution. With 7.5% of silica present the ultimate blue improves up to about 1.5 mols of ferrocyanide to one mol of ferricyanide.

EXAMPLE III

A coating solution was made up as follows:

| | Ml. |
|---|---|
| Stock solution B | 250 |
| Stock solution C | 50 |
| Geon polyblend (synthetic organic latex) | 3 |

The pH was raised to 7.8 by adding 50% potassium carbonate solution.

Sized paper stock as conventionally used for blueprint was coated with this solution and the prints made therefrom exhibited the improved blue color, improved contrast and reduced bleeding found to be characteristic of blueprint paper produced with silica in the coating solution but in addition it was possible to write on the print without feathering and the blue color was more uniform and smoother particularly in the range of low exposure on the wedge prints. The coated paper was exposed to an accelerated aging test and found to have better keeping quality than conventional blueprint papers.

EXAMPLE IV

A coating solution was made up as follows:

| | | |
|---|---|---|
| Stock solution B | ml | 250 |
| Stock solution C | ml | 50 |
| Polyco synthetic organic latex | ml | 3 |
| Wetting agent | gram | .1 |

Sized paper stock as conventionally used for blueprint paper was coated with this solution using only one coating roller and a high coating speed. Prints obtained from the paper were excellent, exhibiting a deep velvety true blue color of excellent contrast with no bleeding. They could be written upon with ink, water colors or erasing solutions without feathering. On wedge prints the blue areas were uniformly smooth even at low exposures.

EXAMPLE V

A coating solution was made up as follows:

| | | |
|---|---|---|
| Stock solution A | ml | 500 |
| Santocel CX | grams | 50 |

This solution was coated on sized paper and prints made therefrom showed better quality blue than commercial precoat blueprint paper.

Having thus described the invention, what is claimed is:

1. The method of making blueprint paper which comprises applying to a sized paper sheet, a blueprint sensitizing solution containing a ferricyanide salt, a ferrocyanide salt, a ferric salt and dispersed finely divided silica, the particle size of said dispersed finely divided silica being substantially all less than 14 microns in diameter, the ratio of said ferrocyanide salt to said ferricyanide salt being at least 1.5 to 1.0 on a molal basis and the concentration of said finely divided silica being at least ¼ lb. per gallon of solution.

2. The product produced by the method of claim 1.

3. The method of making blueprint paper which comprises applying to a sized paper sheet, a blueprint sensitizing solution containing a ferricyanide salt, a ferrocyanide salt, a ferric salt, dispersed finely divided silica and dispersed synthetic organic solids compatible with the rest of the solution, the particle size of said dispersed finely divided silica being substantially all less than 14 microns in diameter, the ratio of said ferrocyanide salt to said ferricyanide salt being at least 1.5 to 1.0 on a molal basis, the concentration of said finely divided silica being at least .25 lb. per gallon of solution and the concentration of said dispersed synthetic organic solids being between .04 and .40 lb. per gallon of solution.

4. The product produced by the method of claim 3.

5. The method of making blueprint paper which comprises applying to a sized paper sheet, a blueprint sensitizing solution containing a ferricyanide salt, a ferrocyanide salt, a ferric salt and dispersed finely divided silica, the particle size of said dispersed finely divided silica being substantially all less than 14 microns in diameter, the ratio of said ferrocyanide salt to said ferricyanide salt being at least 1.5 to 1.0 on a molal basis, the concentration of said finely divided silica being at least 7.5%.

6. The product produced by the method of claim 5.

7. The method of making blueprint paper which comprises applying to a sized paper sheet, a blueprint sensitizing solution containing a ferricyanide salt, a ferrocyanide salt, a ferric salt, dispersed finely divided silica and dispersed synthetic organic acrylic resin solids compatible with the rest of the solution, the particle size of said dispersed finely divided silica being substantially all less than 14 microns in diameter, the ratio of said ferrocyanide salt to said ferricyanide salt being at least 1.5 to 1.0 on a molal basis, the concentration of said finely divided silica being at least .25 lb. per gallon of solution and of said dispersed synthetic organic solids being between .04 and .40 lb. per gallon of solution.

8. The product produced by the method of claim 7.

9. The method of making blueprint paper which comprises applying to a sized paper sheet, a blueprint sensitizing solution containing a ferricyanide salt, a ferrocyanide salt, a ferric salt, dispersed finely divided silica and dispersed synthetic vinyl resin solids compatible with the rest of the solution, the particle size of said dispersed finely divided silica being substantially all less than 14 microns in diameter, the ratio of said ferrocyanide salt to said ferricyanide salt being at least 1.5 to 1.0 on a molal basis, the concentration of said finely divided silica being at least .25 lb. per gallon of solution and of said dispersed synthetic organic solids being between .04 and .40 lb. per gallon of solution.

10. The product produced by the method of claim 9.

References Cited in the file of this patent

UNITED STATES PATENTS

| | | |
|---|---|---|
| 2,317,521 | Crowley et al. | Apr. 27, 1943 |
| 2,360,216 | Fillius | Oct. 10, 1944 |
| 2,433,515 | Jahoda | Dec. 30, 1947 |
| 2,566,709 | Von Glahn | Sept. 4, 1951 |
| 2,604,388 | Staehle | July 22, 1952 |

FOREIGN PATENTS

| | | |
|---|---|---|
| 462,554 | Great Britain | Mar. 11, 1937 |
| 562,666 | Great Britain | July 11, 1944 |